May 30, 1950
H. J. WING
2,509,258
METHOD FOR STERILIZING PRODUCTS
Filed Nov. 17, 1943
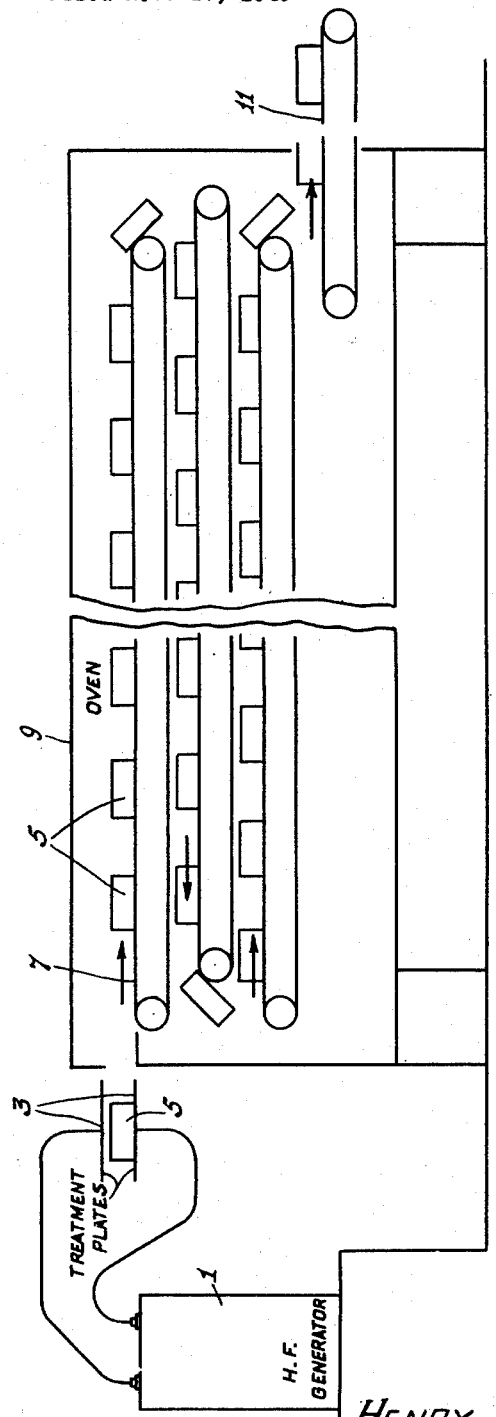
INVENTOR
HENRY J. WING
BY George H Lorch
ATTORNEY Patented May 30, 1950

2,509,258

UNITED STATES PATENT OFFICE 2,509,258

METHOD FOR STERILIZING PRODUCTS

Henry J. Wing, Milltown, N. J., assignor to Johnson & Johnson, a corporation of New Jersey Application November 17, 1943, Serial No. 510,645

1 Claim. (Cl. 21—54)

This invention relates to sterilizing method particularly suitable for continuous operation and the sterilization of relatively thick products or articles such as, for example, surgical dressings and bandage rolls or other forms of cotton or fabrics.

Present methods of sterilization, particularly in the manufacture of surgical dressings, constitute somewhat of a bottleneck in the production of materials of this character. It is a difficult problem to sterilize products having appreciable body or thickness and particularly to do so in an efficient and economical manner. The best known and the more modern attempts at continuous sterilization methods involve the use of high frequency light rays, but such rays have very little power of penetration. Increasing the intensity of the rays in an attempt to speed up the sterilization process has very little effect relative to the increased cost incurred thereby and furthermore does not appreciably increase the depth of penetration. Accordingly it is customary to "batch" sterilize products having considerable depth or thickness, such as surgical dressings and rolls of gauze or cotton. In this method or system, batches of such materials are loaded on a tray or rolling device and moved into an autoclave where they are subjected to heat produced by steam and are maintained in such an autoclave for a sufficient period to kill all organisms and spores. After a sufficient time has elapsed, the batch of material is removed and the autoclave is again reloaded with another batch and the process repeated.

The time consumed in order to completely sterilize products by steam sterilization is relatively great because the products must be heated in such an apparatus from the outside in and it takes considerable time before the interior of such products reach sterilizing temperature after which they must be maintained at this temperature long enough to sterilize the entire product. Obviously such a procedure, and the time consumed thereby, is not compatible with present day mass production methods.

It is the purpose of this invention to provide an improved method and apparatus by which products of considerable depth or thickness can be sterilized in a continuous operation. It is within the contemplation of this invention to accomplish continuous sterilization by first bringing the products to be sterilized to sterilizing temperature by means effective to heat the entire product uniformly and simultaneously, i. e., the interior at the same time as the exterior, and then to maintain this sterilizing temperature by other more economic and effective means if so desired.

A better understanding of this invention will be had from the following description taken in connection with the drawing which illustrates diagrammatically an apparatus for accomplishing this invention.

In accordance with this invention, the entire product to be sterilized is first brought to sterilizing temperature uniformly, simultaneously, and quickly by being placed in a high frequency electrostatic field having sufficient capacity and effect to rapidly heat the entire product, including the interior to the temperature of sterilization after which the field strength may be reduced or, for the sake of economy, the heated product may be transferred immediately to and continuously through a heated oven and maintained at or above the sterilizing temperature for a time sufficient to insure complete sterilization of the entire product.

As illustrated in the drawing there is provided a high frequency generator 1 for developing high frequency induction currents, for example, of the order of 30 or more megacycles. The generator is connected to a pair of electrostatic plates or electrodes 3 between which the products or articles 5 to be sterilized may be placed by hand or by a suitable intermittently operated conveyer (not shown). Obviously the high frequency generator is one of sufficient capacity to heat the entire articles desired to be sterilized to sterilizing temperature uniformly and simultaneously, i. e., the inside and outside, in a time period preferably of the order of seconds or minutes at the most.

The degree of temperature and the time can be varied to suit particular requirements such as the size, shape, and composition of the products being sterilized. The products thus heated between the electrostatic plates through the medium of high frequency currents are then transferred immediately by hand or suitable conveyer (not shown) to a conveyer 7 designed to carry the heated products through an immediately adjacent oven, which may be heated by any suitable means to maintain the preliminarily heated products at the desired sterilizing temperature for the necessary period of time. The conveyer 7 extends from the inlet end of the oven 9 to a point adjacent its outlet. A second conveyer 11 may be utilized to carry the sterilized products out of the oven.

It is obvious that the design and speed of the conveyer for conducting the products through the oven and the construction of the oven will depend upon the capacity desired, and the nature and size of the articles being sterilized.

It has been found that surgical gauze bandage or cotton rolls can be sterilized by a preliminary heating, caused by being in a high frequency electrostatic field for 2½ minutes, at a temperature of 130°–150° C. and subsequent heating in an oven at a temperature of 145°–165° C. for half an hour. By such a method, using apparatus diagrammatically illustrated, all living organisms and spores are definitely killed and the product is sterile.

It will be apparent that the method and apparatus illustrated permits continuous operation and sterilization as distinguished from an intermittent or "batch" operation. Consequently the invention provides an improved and economic method and apparatus for sterilizing products of considerable bulk in a continuous economic manner which eliminates one present bottleneck in mass production and sterilization of products such as surgical dressings, gauze bandages and like products.

It also will be obvious to those skilled in the art that the illustrated apparatus for carrying out the foregoing invention is merely diagrammatic and that the details of construction as well as the temperatures and time periods all may be varied to suit the particular circumstances, conditions and the products being sterilized without departing from the spirit and scope of this invention as defined in the appended claim.

I claim:

A substantially continuous process for sterilizing products which includes the steps of first passing a high frequency current through the products and rapidly raising all parts of each product being sterilized uniformly and substantially simultaneously to sterilizing temperatures and thereafter applying external heat from a separate source to said products and maintaining them at sterilizing temperatures for a sufficient length of time to insure complete sterilization of the products by passing them through a heated oven.

HENRY J. WING.

REFERENCES CITED

The following references are of record in the file of this patent:

UNITED STATES PATENTS

| Number | Name | Date |
|---|---|---|
| 647,603 | Kinne | Apr. 17, 1900 |
| 1,467,669 | Josephs | Sept. 11, 1923 |
| 2,060,634 | Otis | Nov. 10, 1936 |
| 2,064,522 | Davis | Dec. 15, 1936 |